Dec. 12, 1961   R. MATTHEY   3,012,828
BEARING FOR A MOVABLE ELEMENT OF A SMALL MECHANISM, A
PROCESS FOR ITS PRODUCTION AND AN INSTALLATION
FOR CARRYING OUT THIS PROCESS
Filed May 26, 1959

INVENTOR
ROGER MATTHEY
BY John B. Simmentroet
ATTORNEY

United States Patent Office 3,012,828
Patented Dec. 12, 1961

3,012,828
BEARING FOR A MOVABLE ELEMENT OF A SMALL MECHANISM, A PROCESS FOR ITS PRODUCTION AND AN INSTALLATION FOR CARRYING OUT THIS PROCESS
Roger Matthey, Le Sentier, Switzerland, assignor to Parechoc S.A., Le Sentier, Switzerland, a firm
Filed May 26, 1959, Ser. No. 815,932
Claims priority, application Switzerland May 30, 1958
1 Claim. (Cl. 308—159)

The present invention relates to a bearing for a movable element of a small mechanism, a process for its production and an installation for carrying out this process.

The bearing according to the invention is characterised by the fact that it comprises a pivot bearing disposed with clearance within a tubular support and designed to receive the conical end of the shaft of the said movable member, the said pivot bearing supporting a ring externally fixed to its lateral face, one part of which ring constitutes a bearing surface resting, under the action of a resilient return device acting at least indirectly on the said pivot bearing, on a seat formed in the said support, in such manner as to ensure the return of the pivot bearing to the central position when it is displaced as a result of a shock to which the shaft is subjected.

The process for the production of the bearing is characterised by the fact that the said pivot bearing is disposed on a fitting having a supporting surface, the shape and position of which coincide with those of the seat of the support, whereafter the said ring is driven on to the pivot bearing until it comes in contact with the said bearing surface.

The installation for carrying out this process is characterised by the fact that it comprises a fitting having, on the one hand, means for centering the pivot bearing and on the other hand, coaxially with the said centering means, a bearing surface, of which the shape and position coincide with those of the seat of the support, the whole arrangement being such as to enable the said ring to be driven on to the pivot bearing until it abuts the said bearing surface and is thus directly positioned at the desired level.

The accompanying drawings show by way of example two embodiments of the subject of the invention.

Figure 1:
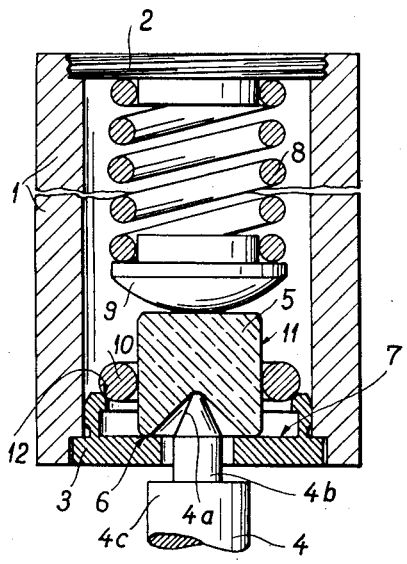
FIGURE 1 is an axial section through a first constructional form of a bearing for a movable element of a small mechanism.
Figure 2:
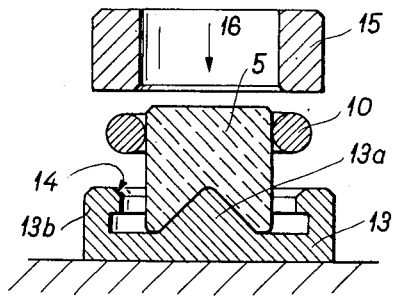
FIGURE 2 is an axial section through a part of the bearing in the course of its assembly and of the installation by which this assembly is effected.

The bearing of FIGURE 1 comprises a support 1 in the form of a cylindrical sleeve, which is intended to be driven into the frame of the apparatus in which the bearing is mounted. The said sleeve is closed at one end by a screw-threaded plug 2 and has a bush 3 driven into its other end. The said bush is formed with a central hole for the passage of the pivot of the shaft 4 of the movable element (not shown).

The conical end of the said pivot, designated 4a, is engaged in the central hole of a stone pivot bearing 5 disposed with clearance in the support. The said pivot bearing has a plane annular surface 6 resting on a corresponding plane surface 7 of the bush 3. These two surfaces are maintained in contact by a coil spring 8 bearing, on the one hand, against the plug 2 and, on the other hand, against the pivot bearing 5 through a thrust pad 9.

Finally, an open ring 10 of circular section is forced on to the smooth lateral face 11 of the pivot bearing 5. The said ring rests, also under the action of the return spring 8, on a seat formed by a slightly chamfered annular edge 12 of the bush 3.

When the shaft 4 is subjected to shocks, the pivot bearing moves within the support of the bearing against the action of the spring 8. The latter returns it to its central position by virtue of the co-operation of the bearing surface formed of the ring 10 with the seat 12, on the one hand, and of the surfaces 6 and 7 on the other hand. At the end of the stroke, during the radial movements of the shaft 4, its portion 4b abuts the edge of the central hole in the bush 3, while, during axial displacements, it is the shoulder 4c of the shaft 4 which abuts the bush.

Instead of being open, the ring 10 may be closed. The cross-section of the ring need not be circular. However, it is important that that portion of the ring forming the bearing surface which is in contact with the seat of the support should be of such form—rounded, frusto-conical, etc.—that the said ring moves readily on the seat. The latter may also be different from the edge 12 described and illustrated and may be, for example, frusto-conical.

The ring 10 is mounted on the pivot bearing 5 by means of a fitting 13 having at its centre a conical projection 13a effecting the centering of the pivot bearing 5. A lateral wall 13b of the fitting 13 is formed with a chamfer 14, the dimensioned position of which coincides exactly with those of the seat 12 of the bush 3 when the pivot bearing 5 rests on the base of the bush. Thus, by driving the ring 10 around the pivot bearing 5 by means of a press with the aid of a ring 15 in the direction of the arrow 16, the ring 10 is brought into contact with the chamfer 14. The ring is then directly positioned at the appropriate level on the pivot bearing 5. Owing to this arrangement, slight variations in the diameter of the pivot bearing or in the cross-section of the ring 10 have no effect, whereby the tolerance limits are extended and the cost of production of the bearing is reduced.

Figure 3:
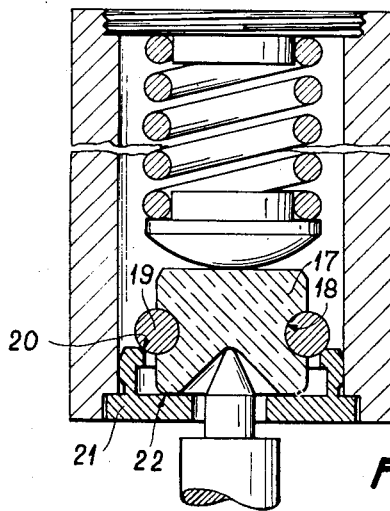
FIGURE 3 is an axial section through a second constructional form of a bearing.

The constructional form of FIGURE 3 differs from the first in that the pivot bearing designated 17 has in its outer lateral face a groove 18 of semi-circular cross-section, in which there is partially lodged an open ring 19 co-operating with a seat 20 formed in the bush designated 21, on which the pivot bearing rests by its terminal bearing surface 22. The operation of this constructional form is the same as that of the first constructional form. In a variant, the cross-section of the groove and that of the ring may be different.

The ring may also be formed by the last convolution of the spring 8. In this case, the pad 9 will be omitted and the last convolution of the spring will be separated from the remainder of the convolutions by a section of different inclination, formed by an extended convolution. The last convolution performing the function of a centering ring will be partially lodged in an annular groove in the pivot bearing. Finally, the centering ring need not be open, but it may be closed and fitted around the pivot bearing, which will then have no groove and will bear against an external bearing surface on the pivot bearing.

What I claim is:

In a bearing for a shaft with a conical end of a small mechanism, especially of a measuring instrument, a tubular support, a cylindrical pivot bearing disposed with clearance within said support and intended to receive said conical end of the shaft, a ring forced externally, in an adjustable position, on the lateral cylindrical face of said pivot bearing, a bearing surface formed on said ring, a frusto-conical seat for the said bearing surface formed in said support, a plane surface formed in the said support, perpendicularly to the axis of the bearing, on which plane surface the front end of the said cylindrical bearing is intended to bear, and a resilient return device acting at least indirectly on said pivot bearing for urging on the one hand said bearing surface of the said ring to rest on said seat and on the other hand the front end of the said pivot bearing to rest on the said plane surface of the support, in such manner as to insure the return of the pivot bearing into a plumb and centered position when it is displaced as a result of a shock to which the shaft is subjected.

References Cited in the file of this patent

UNITED STATES PATENTS

| 1,385,400 | Scheibe | July 26, 1921 |
| 1,843,868 | LeRoy Copelin | Feb. 2, 1932 |
| 2,219,067 | Colomb | Oct. 22, 1940 |
| 2,480,114 | Bradbury | Aug. 30, 1949 |

FOREIGN PATENTS

| 886,085 | Germany | Aug. 10, 1953 |
| 305,508 | Switzerland | May 2, 1955 |